Feb. 21, 1933.  J. J. O'BRIEN  1,898,848
LIQUID GAUGE
Filed Aug. 5, 1929   2 Sheets-Sheet 1
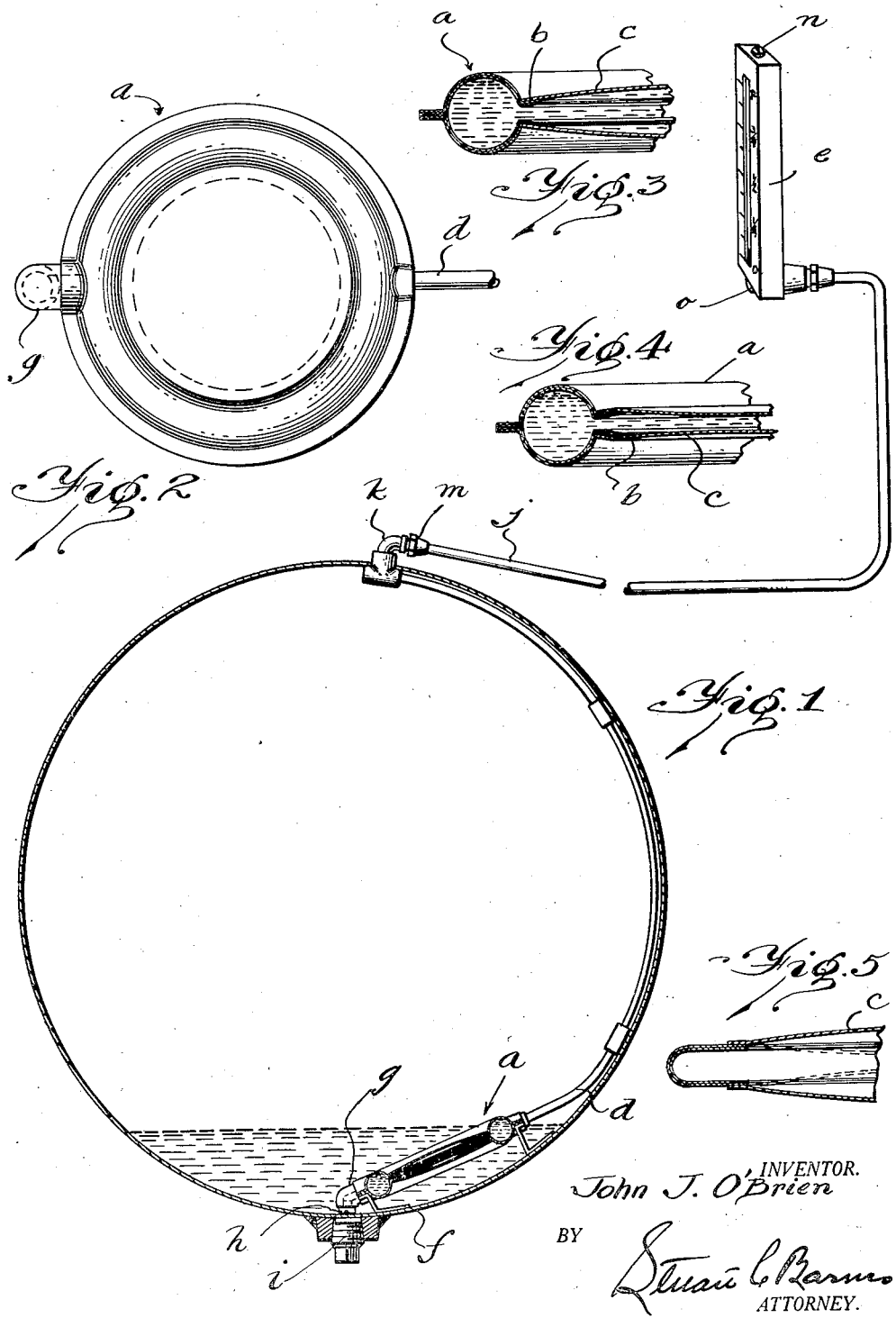

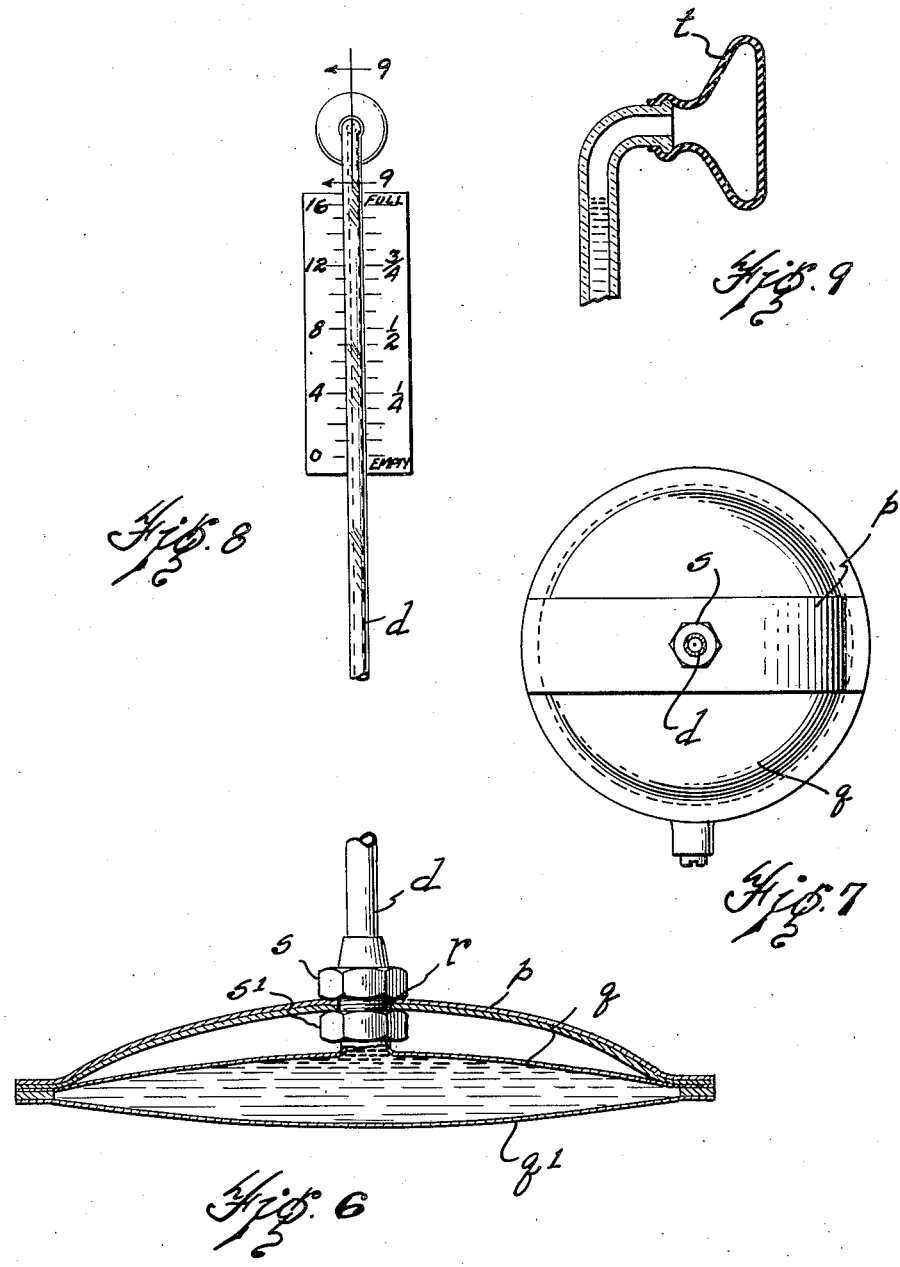

Patented Feb. 21, 1933

1,898,848

UNITED STATES PATENT OFFICE

JOHN J. O'BRIEN, OF DETROIT, MICHIGAN, ASSIGNOR TO AUTO AND PLANE ENGINEERING COMPANY, OF DETROIT, MICHIGAN, A CORPORATION OF MICHIGAN

LIQUID GAUGE

Application filed August 5, 1929. Serial No. 383,706.

This invention relates to liquid gauges, and especially a gauge for a gas tank or the crank case contents of an automobile.

Numerous gauges have been designed heretofore, among them—float operated gauges, electric gauges, and gauges operated by an air column; but float-operated gauges are entirely undependable; electrically-operated gauges are delicate, and frequently get out of order, and the air column gauges have also been subject to many difficulties and are undependable due to the constant need of replenishing the air in the column. Furthermore, some of these gauges are comparatively expensive and are often hard to install.

It is the object of the present invention to provide a very simple, yet efficient gauge in which the indicating liquid is entirely isolated from the contents to be measured, and in which the rise and descent of the indicating column is controlled by the pressure on a pressure-sensitive device at the bottom of the indicating column. This pressure of course varies with the volume, consequently by registering the pressure on this sensitive device in the tank it is possible to know the volume in the tank.

In order to make this device accurate a compensating device is provided for taking care of the expansibility of the liquid column due to changes in temperature. This is accomplished by means of a thermostat.

Referring to the drawings:

Fig. 1 is a vertical section of a gasoline tank equipped with my invention.

Fig. 2 is a plan view of the pressure-sensitive unit.

Fig. 3 is a fragmentary section of the same in expanded condition.

Fig. 4 is a fragmentary section of the same in contracted condition.

Fig. 5 is a fragmentary section of a slightly modified form.

Fig. 6 is a cross section of a modified form of pressure-sensitive element.

Fig. 7 is a plan view of the same.

Fig. 8 is an elevation of a modified form of dash indicator.

Fig. 9 is a section on line 9—9 of Fig. 8.

The pressure-sensitive unit designated $a$ comprises an annulus or ring made up of thermostat metal such as copper or bronze on the inside, and metal of a low coefficient of expansion on the outside, such as invar steel. This annulus is made up of two half-sections which are nearly half-segments of a circle; they are slightly open on their inner side, presenting flanges $b$, on which two thin disks $c$ (about .004) are secured by brazing or soldering. These thin disks are, at atmospheric pressure, somewhat convex, as shown in Fig. 3. But under the pressure of the entire contents of the tank each will be decidedly concave, as shown in Fig. 4.

It will be apparent that if a suitable liquid is enclosed within the chamber defined by these disks, and the thermostat annulus, that it will be ejected through an opening in said pressure sensitive unit as the contents of the tank is increased, and it will be allowed to return into this chamber as the contents of the tank decrease.

A small column of this liquid can pass up through the small pipe $d$, to a gauge $e$ on the instrument board of the car. Numerous liquids can be used in the gauge. It should be liquid that does not evaporize under operating temperature, nor freeze or boil under ordinary operating temperatures,—such as between 10° below zero F., 120° above zero. In fact, for cars used in very cold countries the 10° downward limit might be somewhat reduced. Furthermore it should preferably be a liquid of a low co-efficient of expansion.

The pressure-sensitive device is assembled in the bottom of the tank by the supporting brackets $f$ when the tank is made. These are provided with a nipple portion $g$, the downward portion of which is closed by a screw plug $h$. This registers with the drain plug $i$ in the bottom of the tank.

The tank is shipped to the automobile manufacturer who couples up the gauge connecting pipe $j$ with the tank nipple $k$, by means of the union $m$. The plug $h$ is removed and the pressure-sensitive device and also the gauge tube is pumped full of the registering liquid. In fact the liquid is pumped up into the gauge. The air escapes through an air vent $n$. This air vent can then be closed by the finger or otherwise, and the contents of the chamber and the pipe will not run out, or will run very slowly, due to the lack of access of the atmospheric air. The plug $h$ can be put back in place to close the bottom of the pressure-sensitive device.

It is then possible to adjust the liquid column to the zero point by draining enough liquid from the gauge by removing the plug $o$. The calibration of the gauge can be made initially when the first installation is made. Of course if all the conditions are substantially uniform this calibration will do for all similar installations.

The thermostat works by expanding slightly with temperature changes to compensate the increased expansion of the liquid in the container and in the tubing, due to the same temperature changes. The exact movement of the thermostat is something that will have to be worked out by experiments and of course will vary with different liquids, different lengths of column, and size of containers. By varying the metals in the thermostat slightly, more or less spreading of the open ring can be secured to nicely compensate for the results of temperature variations in the liquid or registering medium.

In Figs. 6 to 9 inclusive, a modified form of construction is shown. Here the thermostat is in the form of a strip $p$. The tube $d$ is secured by a union nut to the nipple $r$ that is soldered or brazed into the upper pressure sensitive disk $q$. The nuts $s$ and $s^1$ adjustably secure the nipple to the thermostat strip $p$. Consequently the lower disk $q^1$ does most if not all of the expansion and contraction due to pressure changes, while the upper disk $q$ is raised and lowered in accordance with temperature changes to compensate for the expansion of the registering liquid. The relation of the thermostat to the upper disk can be altered by the adjusting nuts $s$ and $s^1$ and consequently the thermostat has an adjustment.

This construction may in many ways be cheaper in its embodiment than the structure heretofore described.

In place of utilizing an air vent in the top of the tube I can use a collapsible rubber cap $t$ over the end of the tube so that the rise of the registering liquid column will not tend to compress the air but will simply fill out the rubber cap, and likewise the falling of the registering column will not create a vacuum. On the other hand, the cap will have the advantage of preventing the entry of any dust into the tube.

What I claim is:

1. In a liquid volume indicator, a pressure-sensitive unit for insertion in a chamber containing liquid, and comprising one or more relatively thin flexible disks, a tube having a registering column and connected to one of the disks and communicating with the interior of said unit, and a thermostat connected with one of said disks to raise and lower the same to alter the capacity of the unit and thereby compensate for temperature changes.

2. In a liquid volume indicator, a pressure-sensitive unit for insertion in a liquid container comprising a tubular thermostatic metal ring having a slot extending around its inner periphery, a pair of relatively thin flexible discs having a liquid tight joint with the thermostatic ring along the upper and lower edges of the said slot whereby the tubular thermostatic ring and discs form an indicating liquid receiving chamber the volume of which is varied as the thermostatic ring moves the discs toward and away from each other, and a tube having a registering column communicating with the interior of the said chamber unit whereby the volume of the liquid within the container is indicated by the liquid in the registering column when the discs flex in and out according to the pressure changes of the liquid in the container.

In testimony whereof I have affixed my signature.

JOHN J. O'BRIEN.